E. M. WHITE.
SPLASH TROUGH FOR LUBRICANTS.
APPLICATION FILED APR. 10, 1916.
1,194,800.
Patented Aug. 15, 1916.
2 SHEETS—SHEET 1.
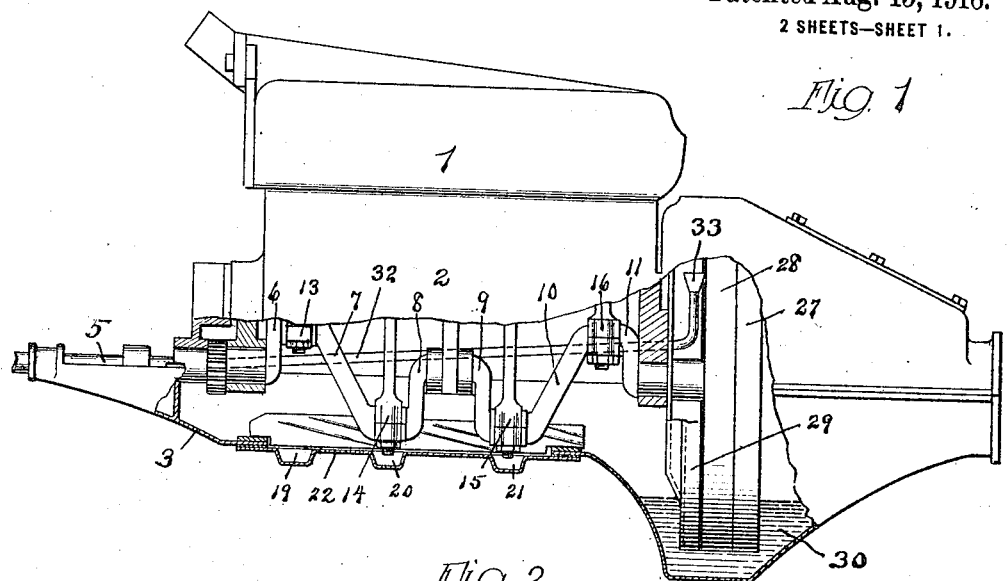
Fig. 1
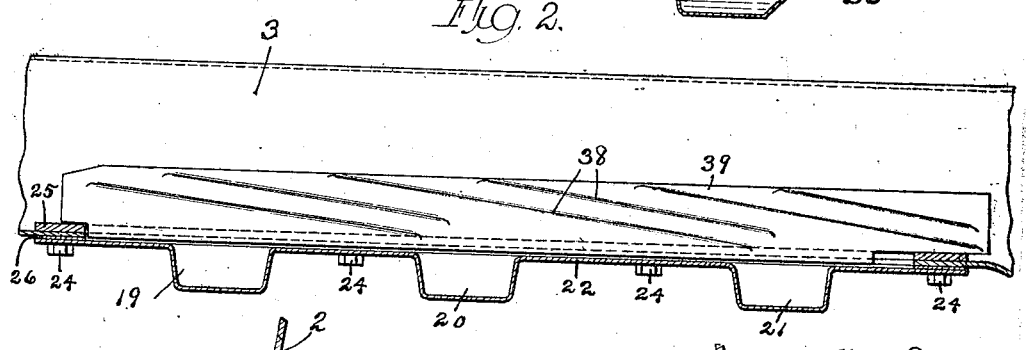
Fig. 2.
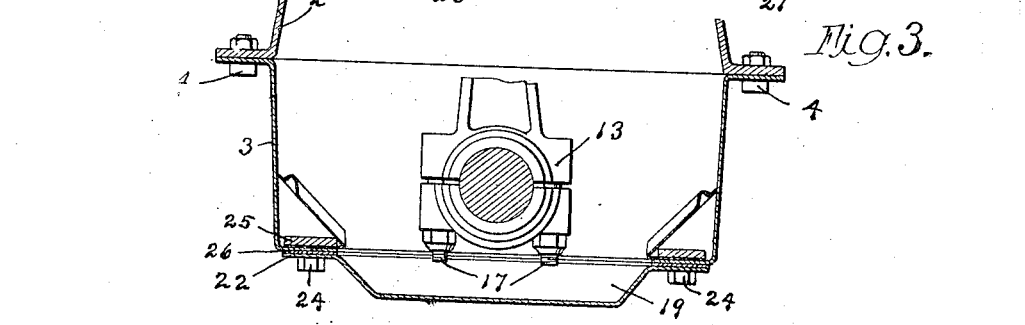
Fig. 3.
Fig. 4.
WITNESS
O.R. Barrett
INVENTOR
Ernest M. White.
BY
Pagelsen and Spencer.
ATTORNEYS.

E. M. WHITE.
SPLASH TROUGH FOR LUBRICANTS.
APPLICATION FILED APR. 10, 1916.
1,194,800.
Patented Aug. 15, 1916.
2 SHEETS—SHEET 2.
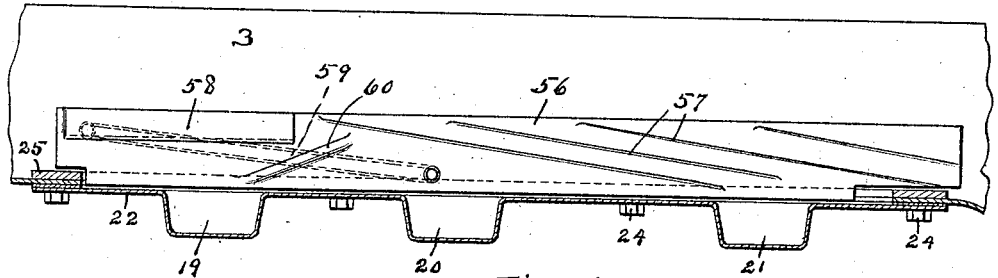
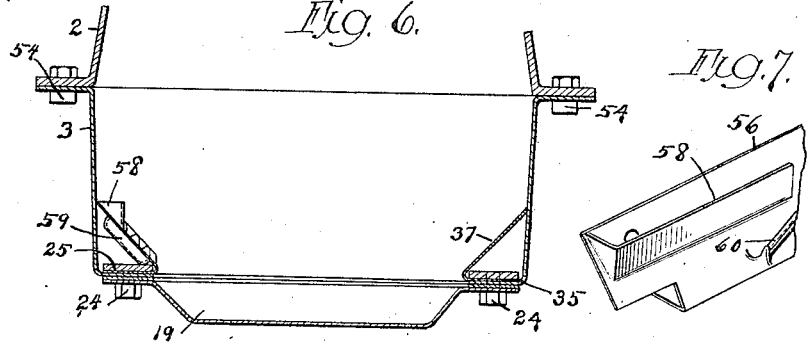
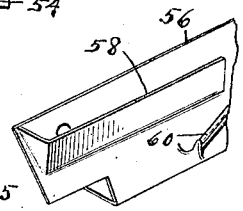
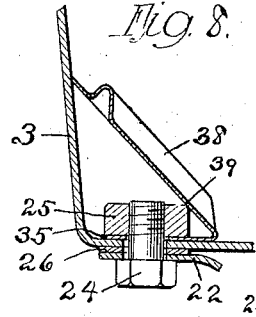
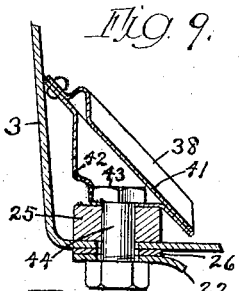
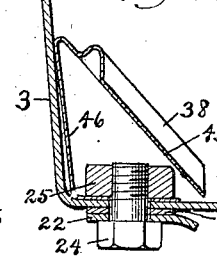
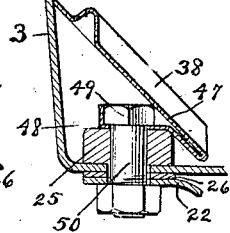
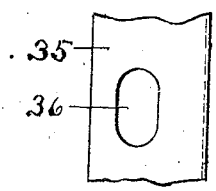
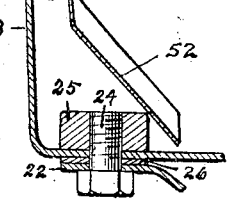
Inventor
Ernest M. White.
By Pagelsen and Spencer
Attorneys
Witness
E. R. Barrett

UNITED STATES PATENT OFFICE.

ERNEST M. WHITE, OF DETROIT, MICHIGAN.

SPLASH-TROUGH FOR LUBRICANTS.

1,194,800.  Specification of Letters Patent.  Patented Aug. 15, 1916.

Application filed April 10, 1916.  Serial No. 90,188.

*To all whom it may concern:*

Be it known that I, ERNEST M. WHITE, a citizen of the United States, and residing at Detroit, in the county of Wayne and State of Michigan, have invented a new and Improved Splash-Trough for Lubricants, of which the following is a specification.

This invention relates to means adapted to be mounted within the crank case of an internal combustion engine adjacent to the oil reservoirs in the bottom thereof into which the connecting rods dip and from which they splash up the liquids that lubricate the various movable parts of the engine, and its object is to provide means for properly distributing the lubricating liquid along the various reservoirs and prevent excessive accumulation at any one of them.

This invention consists of sheet metal members comprising two portions meeting at an acute angle, one of them formed with holes to permit the passage of bolts already in use for securing two parts of the engine together, between which two parts the perforated member extends, the other member being formed with inclined grooves, if desired, to carry the splashed-up lubricant longitudinally of the crank case.

In the accompanying drawings, Figure 1 is a view, partly in elevation and partly in vertical section, of an internal combustion engine of well known construction equipped with one of these improved splash troughs. Fig. 2 is a section of a portion of the bottom of the crank-case on a larger scale. Fig. 3 is a transverse vertical section of the lower portion of the crank-case. Fig. 4 is a perspective of one end of the reinforcing bar for the bottom portion of the crank case. Fig. 5 is a view similar to Fig. 2 showing a modified form of trough in position. Fig. 6 is a cross section similar to Fig. 3 showing this modified form of trough in position. Fig. 7 is a detail of this modified form of trough. Figs. 8, 9, 10, 11 and 13 are cross sections of troughs and the means for securing them in position. Fig. 12 is a detail of the lower flange of a trough.

Similar reference characters refer to like parts throughout the several views.

The engine shown in Fig. 1 is that of the well known Ford car, and is taken merely as an example of present tendencies in engine construction. Its cylinders 1 are cast in a block and connect to the upper part 2 of the crank case. The lower part 3 of the crank case is usually of pressed sheet steel and is secured to the part 2 by means of screws or bolts 4. The crank-shaft 5 has cranks 6, 7, 8, 9, 10 and 11 which receive thrusts from the lower ends of the connecting rods 13, 14, 15 and 16. These connecting rods have extensions 17 on their cap bolts to dip into the lubricating oil in the small receptacles 19, 20 and 21 in the cover 22 of the lower part 3 of the crank case, which cover is held in position by means of screws 24 that extend through holes in the cover and part 3 of the crank case and into threaded holes in the reinforcing bar 25. A gasket 26 is usually placed between the cover 22 and the crank case.

The rear end of the crank case, that is, the right hand end in Fig. 1, is expanded to make room for the fly-wheel 27, magnet carrier 28 and the stationary magneto support 29, shown conventionally in Fig. 1, and also to constitute the main oil receptacle 30. When the engine is running, a heavy mist of oil fills the entire case, and this mist is usually heavier at the rear end of the case than at the front end when the vehicle is moving. It is therefore substantially unnecessary to have an auxiliary trough for lubricants below the rear cylinder.

An oil pipe 32 extends into the stationary magneto support and is provided with a funnel 33 to receive the oil that is carried up by the fly-wheel 27 and the magnet carrier, and this oil flows to the front end of the lower case and into the front auxiliary receptacle 19, whence it is splashed up against the walls of the case and into the bore of the forward cylinder by means of the lower end of the connecting rod 13. When the vehicle runs on a level road, the oil usually fills the lower case up to the top of the reinforcing bar 25, which results in excessive lubrication of the cylinders. The oil finally flows over the rear transverse portion of this bar into the main oil receptacle 30.

When the vehicle runs down hill, the front end of the case fills with oil and an excessive quantity is splashed up by the connecting rod 13, causing excessive lubrication of the front cylinder while the third auxiliary receptacle may be almost dry and the third and fourth cylinders receive too little lubrication. The excess of lubricant in the front cylinder is burned and causes an undesirable deposit of carbon at the spark plugs and valves, while under-lubrication of the rear cylinders may result more seriously.

The present invention is embodied in means for preventing excessive accumulation of lubricating oil in the case, especially at any particular point thereof beneath the cylinders, by conveying this oil toward the rear and into the main receptacle, and in means for preventing the lubricating oil from flowing toward the main receptacle along the edge of the bottom of the crank case, particularly between the reinforcing bar 24 and the adjacent sides of the crank case. These means are so constructed that they can be quickly and easily secured in position by means of bolts already in use to hold two of the parts of the engine together.

Strips of sheet metal are formed substantially V-shaped in cross-section, with one wing or portion wider than the other. This wider wing may be formed with inclined channels for the lubricating oil as hereinafter set forth. The narrower wing 35 is preferably formed with elongated holes 36 so spaced that when this wing is inserted between the bottom 22 and the reinforcing bar 25, the bolts 24 may again be inserted to secure the bottom 22 in its former position and at the same time hold the conveyer for the lubricant in operative position.

As the crank-shaft revolves, the oil is splashed up by the crank-shafts, not only against the wall toward which the connecting rod swings as it passes through the auxiliary oil receptacles, but also against the opposite side. This oil normally runs down this opposite side and into the space between this side and the reinforcing bar 25, and in this space it flows to the main receptacle 30 without having served any useful purpose. But by placing an oil conveyer consisting of the bottom portion 35 and an inclined portion 37 against the side of the crank case and properly securing it in position, the oil that runs down the side of the crank case will be conveyed to one of the auxiliary receptacles, and thus into the path of the lower end of a connecting rod and so may be splashed again.

Whether the oil is to be conveyed to the receptacle from which it was splashed or into the receptacle next to the rear may be determined by the surface of the inclined portion of this conveyer. If the surface is flat, as in the conveyer shown at the right in Fig. 6, the lubricant will flow back into the receptacle from which it is splashed, which is sufficient for one side of the crank case. The inclined member of the conveyer for the other side of the case is preferably formed with inclined grooves to carry the oil toward the main receptacle 30.

In Fig. 2 is an elevation and in Fig. 8 is a cross section of an oil conveyer adapted to carry the lubricant that is splashed up from each of the auxiliary receptacles to the next receptacle in the rear, the last troughs 38 formed in the plate 39 carrying the oil over and beyond the rear cross member of the reinforcing bar 25.

It will be apparent that this invention may be embodied in many different forms. Thus in Fig. 9 the grooved inclined member 41 is joined to a bent member 42 that is held against the bar 25 by means of the heads 43 of the bolts 44. Fig. 10 shows the grooved member 45 attached to a bent member 46 which again extends between the reinforcing bar 25 and the bottom of the crank case. In Fig. 11 the inclined member 47 is attached at its lower edge to the curved plate 48 that is held against the reinforcing bar 25 by means of the head 49 of the bolt 50. In Fig. 13, the inclined member 52 connects at its upper edge to the plate 53 that is bent to fit between the parts 2 and 3 of the crank case, being held in position by the bolts 54 already in use.

While the troughs 38 are shown substantially alike in all the structures heretofore discussed, this is not necessary. In Figs. 5, 6 and 7 a structure is shown consisting of the bottom member 25 and an inclined member 56, the latter being formed with inclined troughs 57 extending from opposite the receptacle 20 toward the rear end of the plate 56, a short diagonal trough 60 to cause a portion of the oil to flow back into the receptacle 19, a longitudinally extending gutter 58 to catch the oil splashed up out of the receptacle 19, and a pipe 59 extending from this gutter and discharging into the receptacle 20.

When the car is running on a level, the oil splashed up from the receptacle 19 is caught by the gutter 58 and a portion will drain out of the rear end of this gutter 58 and be caught by the small forwardly inclined trough 60 and guided back to the receptacle 19. The remainder will be carried rearwardly by means of the pipe 59.

When the car is running up hill, the oil will tend to run back over the partitions between the receptacles, but the oil splashed up out of the receptacle 19 and caught by the gutter 58 will run out of its rear end and be caught in part by the trough 60 and be carried back to the receptacle 19. This construction will therefore tend to reduce the excessive flow rearwardly when the car is climbing. On the other hand, when the car is going down hill and an excessive amount of oil collects at the front end and is splashed up by the connecting rod 13, the gutter 58 will collect a large portion of it and this will flow rearwardly through the conduit 59.

It may be desirable to hold the upper edge of the inclined strips, or portions of the oil conveyers shown, against the inner face of the adjacent side wall of the crank case. This may be done by forming the angle between the two members of the oil conveyers shown in the different figures somewhat smaller than that shown in all but Figs. 10 and 13 of the drawings, which causes the bolts 24, 44 and 50 to press the upper edge against the case.

I claim:—

1. In a multi-cylinder engine, the combination of a crank case having a main oil receptacle and a bottom for the crank case formed with a series of alined auxiliary receptacles into which the lower ends of the connecting rod may dip to splash the oil out of said receptacles, means to elevate the oil from the main receptacle and conduct it to the auxiliary receptacle, bolts for securing the bottom to the crank case, and a sheet metal oil conveyer bent to constitute two portions, one of them consisting of a horizontal portion formed with holes through which said bolts may extend to secure the conveyer in position, and the other portion being inclined and having its upper edge in engagement with one wall of the crank case.

2. In a multi-cylinder engine, the combination of a crank case having a removable bottom provided with auxiliary oil receptacles and also having a main oil receptacle adjacent one end of said bottom and to one of the auxiliary receptacles, a reinforcing bar extending within said crank case along the opening which is normally closed by said bottom, screws extending through said bottom and crank case and into said bar, and an oil conveyer mounted within the bottom and consisting of an inclined portion extending from one wall of the crank case downwardly over the reinforcing bar and a second portion extending outwardly from the lower edge of the first below said reinforcing bar and secured in position by said screws.

3. In a multi-cylinder engine, the combination of a crank case formed of a plurality of parts, bolts for securing the parts together, one of said parts having a series of alined receptacles for lubricating oil, and an oil conveyer formed from a sheet of metal bent to constitute two strips at an oblique angle to each other, one of said strips being inclined and extending from a side wall of the crank case to the adjacent edges of said receptacles, the other being formed with holes through which a series of said bolts may extend to hold said conveyer in position.

4. In a multi-cylinder engine, the combination of a crank case formed of a plurality of parts, bolts for securing the parts together, one of said parts having a series of alined receptacles for lubricating oil, and an oil conveyer formed from a sheet of metal bent to constitute two strips at an oblique angle to each other, one of said strips being inclined and extending from a side wall of the crank case to the adjacent edges of said receptacles, the other being formed with holes through which a series of said bolts may extend to hold said conveyer in position, said inclined strip being formed with troughs for conveying the oil longitudinally of the crank case.

5. In a multi-cylinder engine, the combination of a crank case formed of a plurality of parts, bolts for securing the parts together, one of said parts having a series of alined receptacles for lubricating oil, and an oil conveyer formed from a sheet of metal bent to constitute two strips at an oblique angle to each other, one of said strips being inclined and extending from a side wall of the crank case to the adjacent edges of said receptacles, the other being formed with holes through which a series of said bolts may extend to hold said conveyer in position, said inclined strip being formed with troughs which incline downwardly toward one end of the strip.

6. A new article of manufacture consisting of a sheet metal plate bent along a line substantially parallel to one edge so as to form two wings at an acute angle to each other, one of said wings being formed with troughs inclined downwardly toward one end and the other wing being formed with holes properly spaced to admit bolts employed to secure parts of an internal combustion engine together, whereby said wing may be secured to said parts of the engine.

7. A new article of manufacture consisting of a sheet metal plate bent to form two wings at an oblique angle to each other, one of said wings being formed with holes properly spaced to admit bolts employed to secure parts of an internal combustion engine together, and the second wing being formed with a gutter at one end also formed with troughs inclining downwardly toward one end, and a conductor connecting to said gutter and discharging intermediate the ends of said wing.

8. In a multi-cylinder engine, the combination of a crank case formed of a plurality of parts, bolts for securing the parts together, one of said parts having a series of alined receptacles for lubricating oil, and an oil conveyer formed from a sheet of metal bent to constitute two strips at an oblique angle to each other, one of said strips being inclined and extending from a side wall of the crank case to the adjacent edges of said receptacles, the other having cut out portions through which a series of said bolts may extend to hold said conveyer in position, and said parts being at such relation to each other that said bolts will force the upper edge of the inclined strip against said side wall of the crank case.

9. A new article of manufacture consisting of a sheet metal plate bent to form two wings at an oblique angle to each other, one of said wings being formed with a gutter at one end, and a conductor connecting to said gutter and discharging intermediate the ends of said wing.

In testimony whereof I sign this specification.

ERNEST M. WHITE.